United States Patent [19]

Reed

[11] Patent Number: 5,180,343
[45] Date of Patent: Jan. 19, 1993

[54] PULLEY GUARD APPARATUS

[76] Inventor: Michael A. Reed, 5291 W. Garrison Rd., Laingsburg, Mich. 48848

[21] Appl. No.: 808,536

[22] Filed: Dec. 16, 1991

[51] Int. Cl.⁵ ............................................. F16H 57/02
[52] U.S. Cl. ............................................. 474/144
[58] Field of Search ...................... 474/144–147, 474/140; 280/847, 152.2; 74/594.2

[56] References Cited

U.S. PATENT DOCUMENTS 5,003,840 4/1991 Hinschlager .................. 474/144 X
5,134,901 8/1992 Grady .............................. 474/144 X Primary Examiner—Thuy M. Bui
Attorney, Agent, or Firm—Leon Gilden

[57] ABSTRACT

A pulley guard is arranged for mounting to an interior surface of projecting flanges mounting an associated pulley structure, wherein arcuate discs are arranged in confrontation in an edge-to-edge relationship with outer edges of the first and second pulley flanges to prevent the binding and abrasion of a pulley belt preventing slippage relative to an associated pulley.

7 Claims, 4 Drawing Sheets

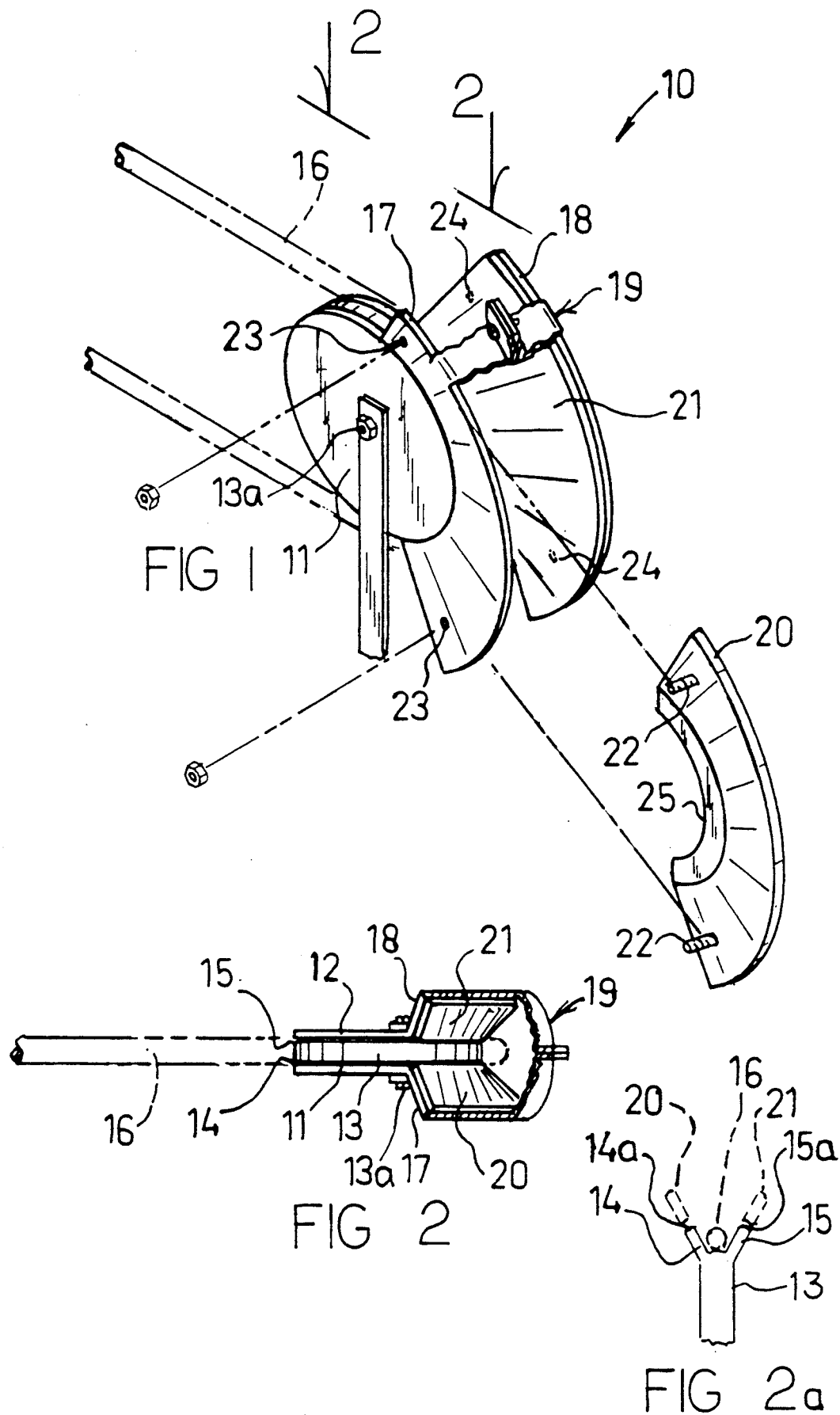

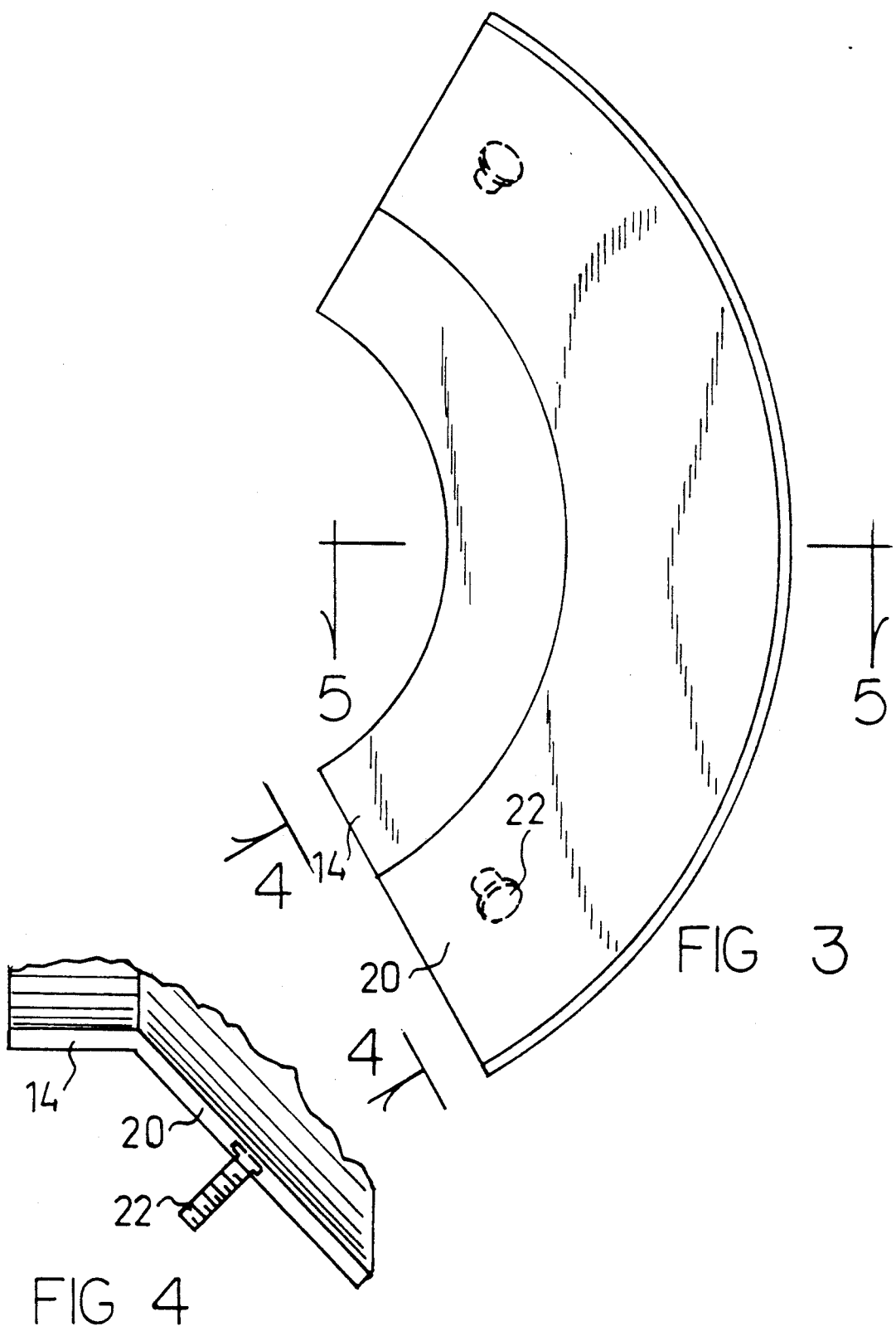

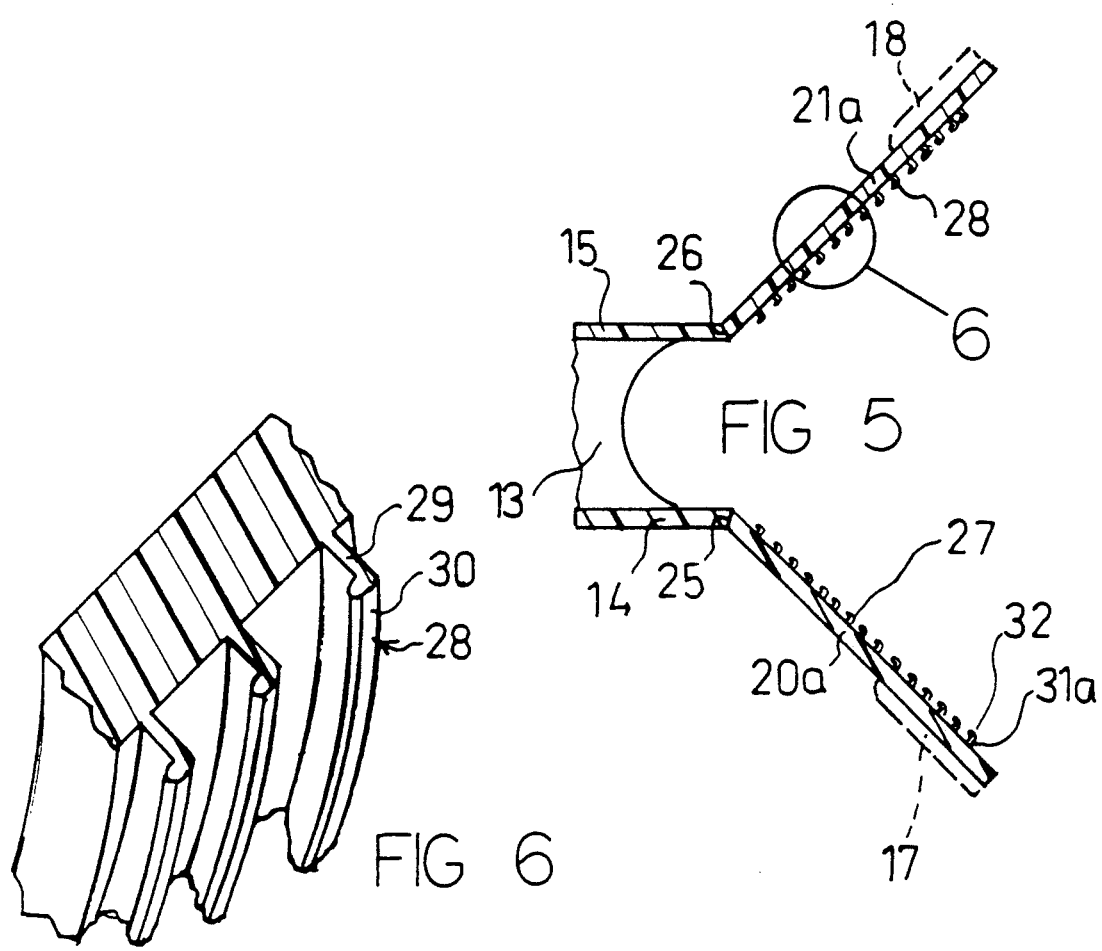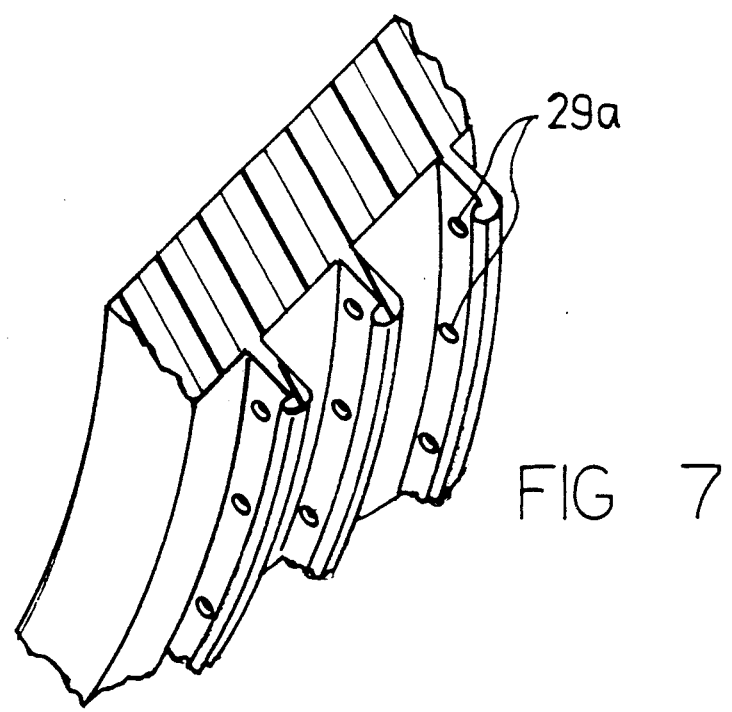

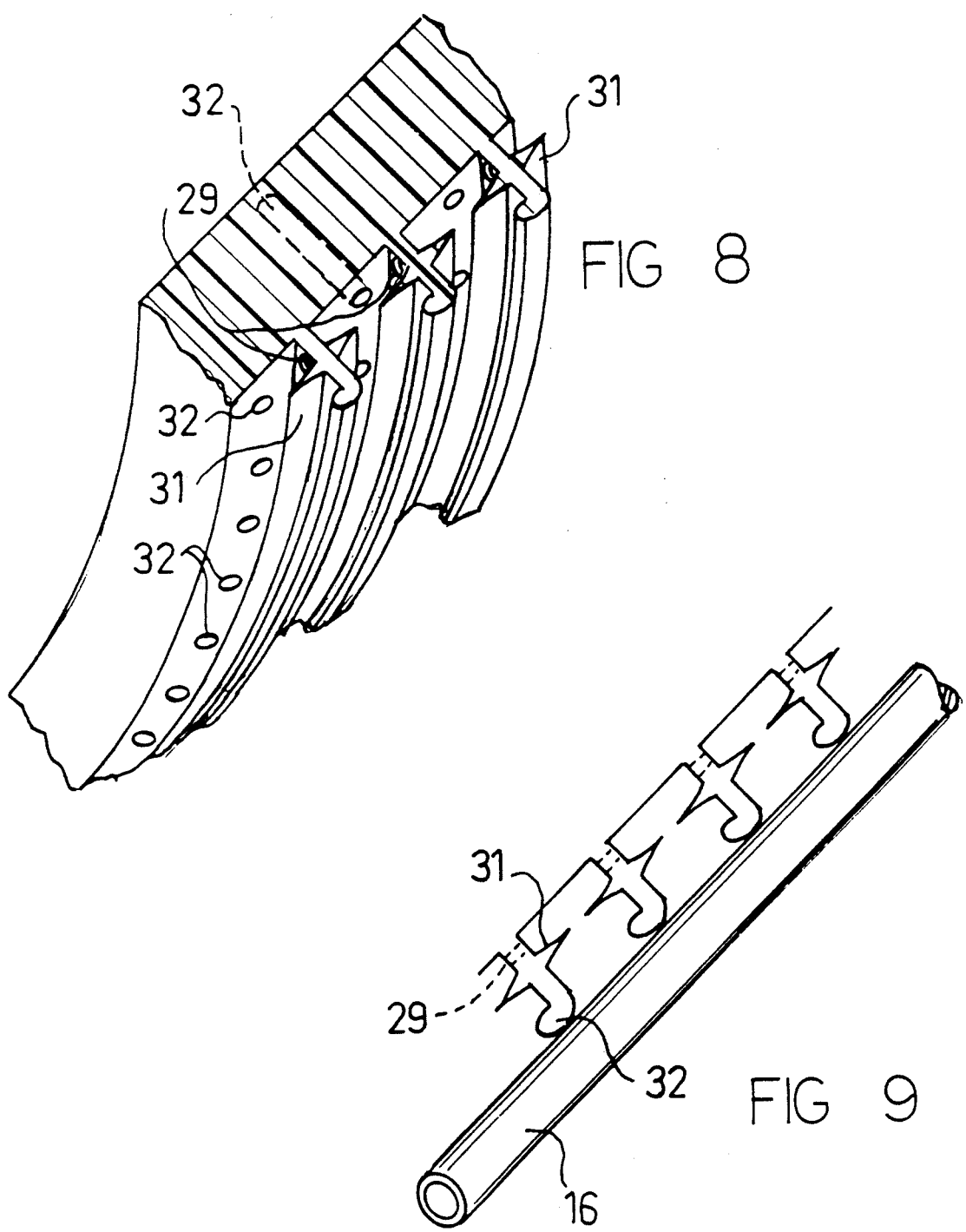

PULLEY GUARD APPARATUS

BACKGROUND OF THE INVENTION

1. Field of the Invention

The field of invention relates to pulley apparatus, and more particularly pertains to a new and improved pulley guard apparatus wherein the same is arranged to effect abutment of opposing flanges of a pulley providing for a surface to maintain a pulley belt into engagement with an associated pulley groove.

2. Description of the Prior Art

Various pulley structure typically to maintain a pulley belt in association with an associated pulley has been provided in the prior art. In this association, the pulley guards are arranged in a stepped relationship relative to an associated pulley belt effecting abrasion and erosion of a pulley belt during slippage relative to an associated pulley.

Accordingly, it may be appreciated that there continues to be a need for a new and improved pulley guard apparatus as set forth by the instant invention which addresses both the problems of ease of use as well as effectiveness in construction in providing for a guide surface to prevent ease of maintaining of a pulley belt about an associated pulley and in this respect, the present invention substantially fulfills this need.

SUMMARY OF THE INVENTION

In view of the foregoing disadvantages inherent in the known types of pulley guard apparatus now present in the prior art, the present invention provides a pulley guard apparatus wherein the same is arranged to provide for a sliding engagement of a pulley belt relative to the guard structure to slidingly direct the pulley belt onto an associated pulley. As such, the general purpose of the present invention, which will be described subsequently in greater detail, is to provide a new and improved pulley guard apparatus which has all the advantages of the prior art pulley guard apparatus and none of the disadvantages.

To attain this, the present invention provides a pulley guard arranged for mounting to an interior surface of projecting flanges mounting an associated pulley structure, wherein arcuate discs are arranged in confrontation in an edge-to-edge relationship with outer edges of the first and second pulley flanges to prevent the binding and abrasion of a pulley belt preventing slippage relative to an associated pulley.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pulley guard apparatus which has all the advantages of the prior art pulley guard apparatus and none of the disadvantages.

It is another object of the present invention to provide a new and improved pulley guard apparatus which may be easily and efficiently manufactured and marketed.

It is a further object of the present invention to provide a new and improved pulley guard apparatus which is of a durable and reliable construction.

An even further object of the present invention is to provide a new and improved pulley guard apparatus which is susceptible of a low cost of manufacture with regard to both materials and labor, and which accordingly is then susceptible of low prices of sale to the consuming public, thereby making such pulley guard apparatus economically available to the buying public.

Still yet another object of the present invention is to provide a new and improved pulley guard apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic view, taken along the lines 2—2 of FIG. 1 in the direction indicated by the arrows.

FIG 2a is an orthographic cross-sectional illustration of a typical pulley in confrontation with the associated insert discs of the instant invention.

FIG. 3 is an orthographic side view of the insert discs of the invention.

FIG. 4 is an orthographic view, taken along the lines 4—4 of FIG. 3 in the direction indicated by the arrows.

FIG. 5 is an orthographic view, taken along the lines 5—5 of FIG. 4 in the direction indicated by the arrows.

FIG. 6 is an isometric illustration, taken of section 6 set forth in FIG. 5.

FIG. 7 is an isometric illustration of the modification as set forth in FIG. 6.

FIG. 8 is a further modification of the insert disc as set forth in FIG. 7.

FIG. 9 is an orthographic view of the insert structure permitting accommodation of a pulley belt directed thereover.

DESCRIPTION OF THE PREFERRED EMBODIMENT

With reference now to the drawings, and in particular to FIGS. 1 to 9 thereof, a new and improved pulley guard apparatus embodying the principles and concepts of the present invention and generally designated by the reference numeral 10 will be described.

More specifically, the pulley guard apparatus 10 of the instant invention essentially comprises a pulley wheel 13 rotatably mounted about a pulley axle 13a mounted between a first frameplate 11 and a second frameplate 12. The pulley belt 16 rides within the pulley wheel 13 between spaced first and second pulley wheel side flanges 14 and 15 respectively terminating in respective first side flange outer circular edge 14a and second side flange outer circular edge 15a. A first frameplate flange disc 17 integrally mounted to the first frameplate extends laterally and defines an obtuse angle between the first frameplate 11 and the first frameplate disc 17, wherein a second frameplate flange disc 18 integrally mounted to the second frameplate defines an obtuse angle therebetween, wherein the first and second frameplate flange discs 17 and 18 are splayed outwardly relative to the pulley wheel 13. If desired, a "U" shaped cover shield 19 may be mounted in surmounting relationship about the first and second frameplate flange discs 17 and 18. A first arcuate insert disc 20 is mounted coextensively to an interior surface of the first frameplate flange disc 17 in confrontation with a second arcuate insert disc 21 coextensive to an interior surface of the second frameplate flange disc 18. First mounting bosses 22 and second mounting bosses 24 are provided and received within associated first mounting bores 23 and second mounting bores (not shown) formed within the respective first and second frameplate flange discs 17 and 18 for securement of the insert discs 20 and 21 to the associated flange discs 17 and 18 respectively. A first insert disc engagement edge 25 is in confrontation with the first side flange outer circular edge 14a of the first side flange 14 of the associated pulley wheel 13 and similarly, a second insert disc engagement edge 26 is in confrontation with an edge-to-edge relationship of a second side flange outer circular edge of the pulley wheel second side flange 15 of the pulley wheel 13. In this manner, an associated pulley belt 16 may project exteriorly from between the associated first and second side flanges 14 and 15 of the pulley wheel 13 providing a smooth engagement surface between the side flanges 14 and 15 and the associated insert discs 20 and 21.

Modified insert discs 20a and 21a respectively are provided for securement to interior surfaces of the first and second frameplate flange discs 17 and 18 to include confronting first and second "L" shaped arcuate ribs 27 and 28 respectively fixedly mounted to interior surfaces of the modified first and second arcuate insert discs 20a and 21a, as illustrated in the FIGS. 5 and 6. Each "L" shaped rib includes a vertical leg and a horizontal leg, wherein the vertical leg is orthogonally mounted to the interior surface of the associated insert disc of a horizontal leg and is spaced in a parallel relationship above the interior surface, in a manner as illustrated, to provide for the ribs to deflect the associated belt 16 back onto engagement with the associated pulley 13 between the side flanges 14 and 15. In this respect, the first and second arcuate ribs 27 and 28 respectively include a first and second vertical leg 29 and 31 and a first and second horizontal leg 30 and 31a, as illustrated in the FIG. 5.

The FIG. 7 illustrates the use of rib bores 29a directed coextensively through the vertical legs of each of the "L" shaped arcuate ribs to enhance drainage of fluid that may be borne about the pulley belt 16 to prevent hydrostatic pressures from permitting engagement of the belt relative to the ribs 27 and 28 by permitting deflection of water therethrough and its subsequent drainage. To further enhance such elimination of fluid such as rain water and the like, plate reservoir conduits 32 directed into each associated insert disc is provided that are directed into the interior surface of each insert disc, as illustrated in FIG. 8. Further, stiffening ribs 31, as illustrated in FIG. 8, are provided and are orthogonally oriented relative to each of the vertical legs of each of the "L" shaped ribs to provide stiffening of the "L" shaped ribs, wherein a pulley belt 16 may, if required, ride upon top surfaces of the horizontal legs of each of the "L" shaped ribs, as illustrated in FIG. 9.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pulley guard apparatus, comprising,
   a pulley wheel, the pulley wheel including a pulley groove circumferentially directed about the wheel, including a first annular side flange and a second annular side flange spaced relative to one another on opposed sides of the groove, and
   a first frameplate mounted to a first side of the pulley wheel, and a second frameplate mounted to a second side of the pulley wheel, with a first frameplate flange disc mounted to the first frameplate extending beyond the first side flange, and a second frameplate flange disc mounted to the second frameplate extending beyond the second side flange mounted to the second side flange, wherein a first frameplate flange disc and a second frameplate flange disc define an obtuse angle therebetween and includes a first frameplate flange disc interior surface and a second frameplate flange disc interior surface in confrontation relative to one another, and a first arcuate insert disc contiguously and coextensively mounted to the first frameplate flange disc interior surface, and a second arcuate insert disc in contiguous and coextensive relationship relative to the second frameplate flange disc interior surface.

2. An apparatus as set forth in claim 1 wherein the first arcuate insert disc includes a first insert disc engagement edge positioned adjacent the first side flange, and the second arcuate insert disc includes a second insert disc engagement edge positioned adjacent the second side flange.

3. An apparatus as set forth in claim 2 wherein the first side flange includes a first side flange outer circumferential edge, and the first insert disc engagement edge is positioned in adjacency in edge-to-edge relationship relative to the first side flange outer circumferential edge, and the second insert disc engagement edge positioned in adjacency in an edge-to-edge relationship relative to the second side flange outer circumferential edge.

4. An apparatus as set forth in claim 3 wherein the first arcuate insert disc includes a plurality of spaced "L" shaped arcuate ribs mounted to an interior surface of the first arcuate insert disc, and a plurality of second "L" shaped arcuate ribs mounted to an interior surface of the second arcuate insert disc, wherein the first "L" shaped arcuate ribs and the second "L" shaped arcuate ribs are arranged in confrontation relative to one another, and each "L" shaped rib of said first and second "L" shaped arcuate ribs includes a vertical leg and a horizontal leg.

5. An apparatus as set forth in claim 4 wherein each vertical leg includes a plurality of drainage apertures directed therethrough.

6. An apparatus as set forth in claim 5 wherein each vertical leg further includes a stiffening rib orthogonally and integrally mounted to each vertical leg.

7. An apparatus as set forth in claim 6 wherein each arcuate insert disc includes a plurality of reservoir conduits directed interiorly of each arcuate insert disc, wherein the reservoir conduits of the first and second arcuate insert discs are in confrontation relative to one another.

* * * * *